United States Patent
Verdiyan et al.

(10) Patent No.: US 7,644,504 B2
(45) Date of Patent: Jan. 12, 2010

(54) VEHICULAR CRASH TEST MEASURING SYSTEM

(75) Inventors: Artur Verdiyan, Ann Arbor, MI (US); Richard M. Hackman, Sterling Heights, MI (US); Craig G. Hysong, Saline, MI (US); Kristy Svatek-Whitson, Temperance, MI (US); Theresa L. Reilly, Jackson, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 41 days.

(21) Appl. No.: 12/128,655

(22) Filed: May 29, 2008

(65) Prior Publication Data

US 2008/0313914 A1    Dec. 25, 2008

Related U.S. Application Data

(60) Provisional application No. 60/945,184, filed on Jun. 20, 2007.

(51) Int. Cl.
    *G01B 5/25* (2006.01)
(52) U.S. Cl. .............................. 33/286; 33/264; 33/534; 33/600; 73/865.3

(58) Field of Classification Search .................. 33/262, 33/263, 264, 286, 534, 600, 613, 645; 73/865.3
See application file for complete search history.

(56) References Cited

U.S. PATENT DOCUMENTS

| 7,216,557 | B2 * | 5/2007 | David et al. ................. 73/865.3 |
| 7,508,530 | B1 * | 3/2009 | Handman ..................... 73/760 |
| 2005/0056104 | A1 * | 3/2005 | David et al. ................. 73/865.3 |
| 2009/0089016 | A1 * | 4/2009 | Kasimsetty et al. ............ 703/1 |
| 2009/0138250 | A1 * | 5/2009 | Thomas .......................... 703/6 |

* cited by examiner

*Primary Examiner*—G. Bradley Bennett
(74) *Attorney, Agent, or Firm*—Ralph E. Smith

(57) ABSTRACT

A fixture for positioning an ATD relative to a vehicle includes a housing attached to the vehicle having a first end and a second end. A locator is mounted on the housing and is movable along the housing between the first end and the second end to identify a position of the ATD relative to the housing. A target is disposed on the ATD and is spaced apart from the housing for alignment with the locator. A first measurement device outputs an angle of the housing that identifies an angular position of the target relative to a plane extending through the first end of the housing.

20 Claims, 3 Drawing Sheets

VEHICULAR CRASH TEST MEASURING SYSTEM

CROSS-REFERENCE TO RELATED APPLICATION

This application claims the benefit of the earlier filing date of currently pending Provisional U.S. Patent Application Ser. No. 60/945,184, filed in the United States Patent Office on Jun. 20, 2007.

FIELD

The present invention relates to automotive testing and more particularly to a test procedure for positioning an automotive test dummy relative to a vehicle.

BACKGROUND

Automotive test dummies (ATDs) are commonly used in automotive testing to validate automotive vehicles and vehicle designs. To ensure repeatability of automotive tests, test fixtures are commonly used to properly position an ATD relative to the vehicle. Conventional test fixtures are typically attached to a reference point of a vehicle such as a door opening to position the ATD relative to the vehicle. Because the test fixture is mounted to a particular reference point of a particular vehicle, the test fixture is commonly a dedicated test fixture that can only be used with a particular vehicle.

One such prior art test fixture is shown in FIG. 1. The prior art test fixture A of FIG. 1 is matingly received within a door opening B of a vehicle C. The test fixture A is fixedly attached to the door opening B and properly locates a head D, hip E, and knee F of an ATD G relative to the vehicle C. While the test fixture of FIG. 1 adequately positions the ATD G relative to the vehicle C, the test fixture A is dedicated to the particular vehicle C and can only be used with that particular vehicle C. Such dedicated test fixtures necessitate a plurality of dedicated test fixtures for use with various vehicles and therefore increase the costs associated with automotive testing and validation.

SUMMARY

A fixture for positioning an ATD relative to a vehicle includes a housing attached to the vehicle having a first end and a second end. A locator is mounted on the housing and is movable along the housing between the first end and the second end to identify a position of the ATD relative to the housing. A target is disposed on the ATD and is spaced apart from the housing for alignment with the locator. A first measurement device outputs an angle of the housing that identifies an angular position of the target relative to a plane extending through the first end of the housing.

A method of positioning an ATD relative to a vehicle includes positioning the ATD in the vehicle, attaching a first end of a housing to a vehicle opening, and rotating the housing relative to the vehicle to position the housing relative to the ATD. A locator is translated along the housing between a first end of the housing and a second end of the housing to position the locator relative to the target disposed on the ATD. A position of the locator is identified along the housing between the first end and the second end and an angle of the housing is identified relative to a plane intersecting a pivot point of the housing. A position of the target relative to the vehicle opening is determined based on the position of the locator along the housing between the first end and the second end and the angle of the housing relative to the plane.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
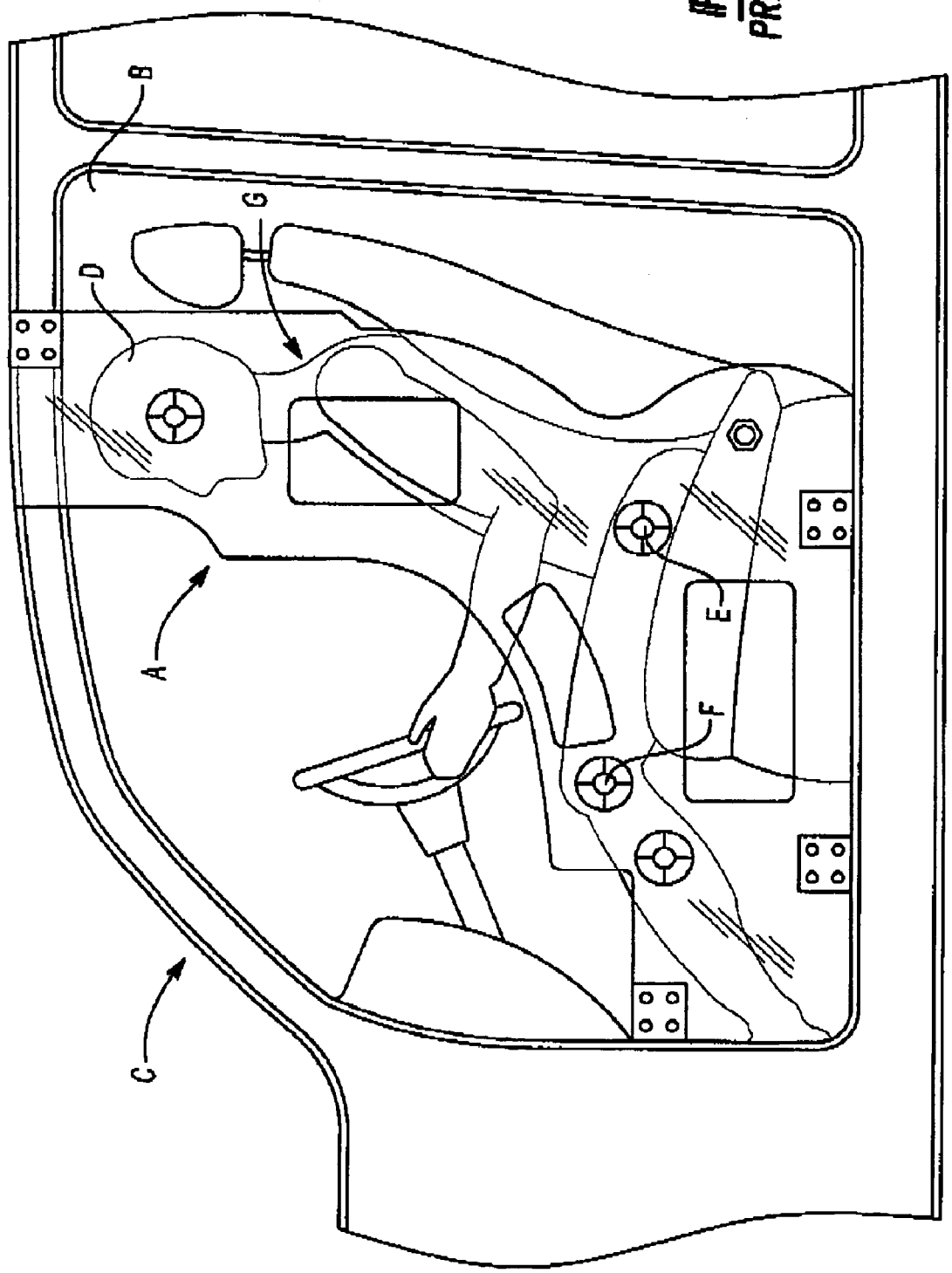
FIG. 1 is a side view of a prior art test fixture for locating an automotive test during relative to a vehicle.
Figure 2:
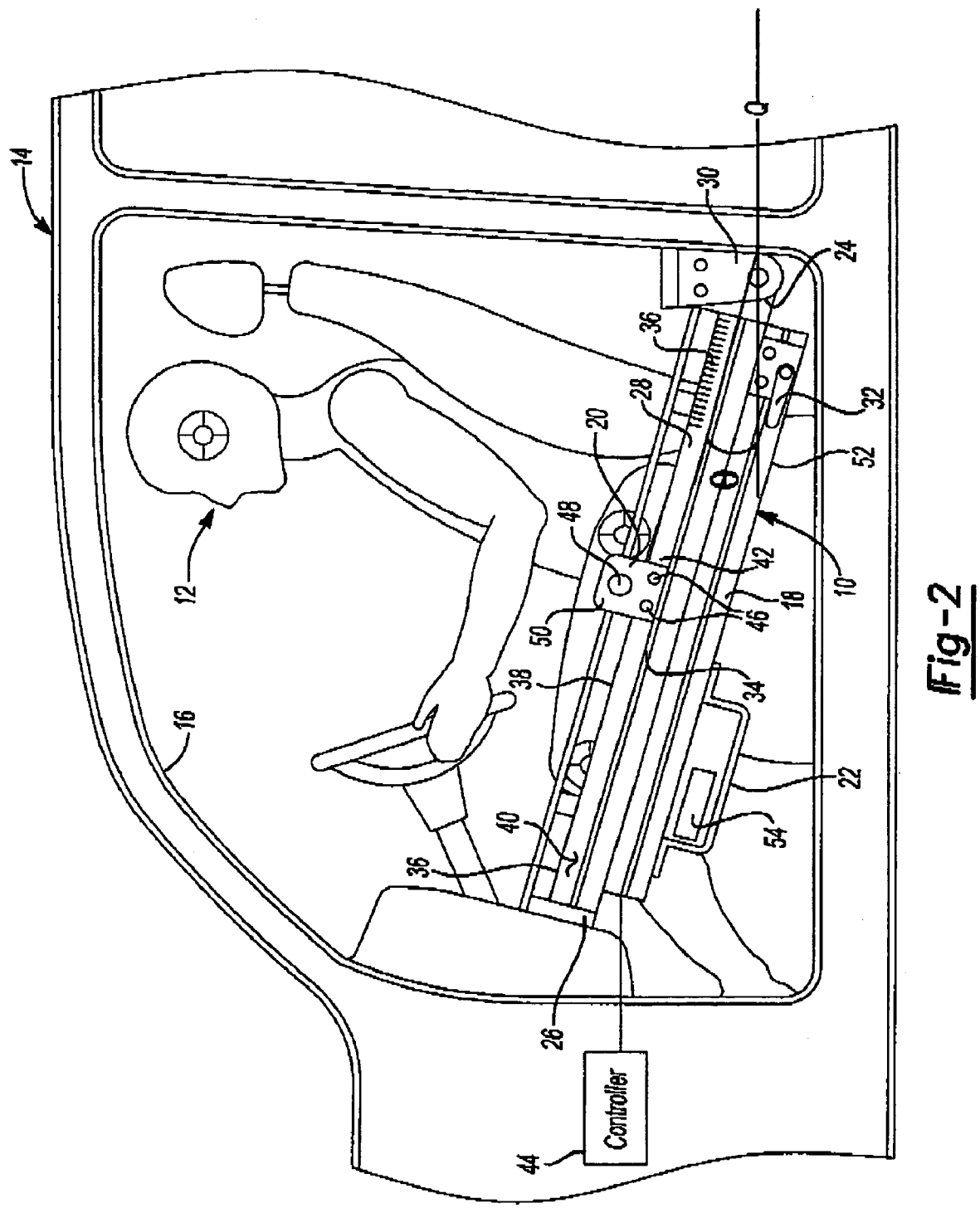
FIG. 2 is a side view of a test fixture in accordance with the principles of the present invention for locating an automotive test during relative to a vehicle.

The following description of the preferred embodiment(s) is merely exemplary in nature and is in no way intended to limit the invention, its application, or uses.

With reference to the figures, a fixture 10 for positioning an automotive test dummy (ATD) 12 relative to a vehicle 14 is provided. The fixture 10 is removably attached to the vehicle 14 and may be used to position the ATD 12 in a desired position relative to a vehicle opening 16 such as, for example, a door opening.

The fixture 10 includes a housing 18, a locator 20, and a measurement device 22. The housing 18 includes a first end 24, a second end 26, and a track 28 extending generally between the first end 24 and second end 26. The first end 24 of the housing 18 may be pivotably attached to the vehicle opening 16 at a striker 30. Because the striker 30 is fixedly attached to the vehicle 14 at the vehicle opening 16, pivotable movement of the housing 18 relative to the striker 30 results in pivotable movement of the housing 18 relative to the vehicle 14 and vehicle opening 16.

The second end 26 of the housing 18 is located at an opposite end of the housing 18 from the first end 24 and may also be attached to the vehicle opening 16, once the housing 18 is positioned in a desired relationship relative to the vehicle opening 16. For example, once the housing 18 is rotated into an angular position relative to the ATD 12 such that the locator 20 may be aligned with the ATD 12, the second end 26 of the housing 18 may be releasably attached to the vehicle opening 16 to maintain the housing 18 in the adjusted position. Alternatively, the first end 24 may include a spring or other locking mechanism (neither shown) that maintains a position of the housing 18 relative to the vehicle opening 16 once the housing 18 is positioned in a desired location relative to the ATD 12 and vehicle opening 16. For example, the first end 24 of the housing 18 may include an actuation handle 32 that selectively toggles a locking mechanism (not shown) between a locked state and an unlocked state. When the locking mechanism is in the unlocked state, the housing 18 is permitted to rotate about the first end 24 of the housing 18 relative to the vehicle opening 16. When the locking mechanism is in the locked state, the housing 18 is restricted from rotating about the first end 24 of the housing 18 relative to the vehicle opening 16.

The track 28 is disposed generally between the first and second ends 24, 26 of the housing 18 and slidably supports the locator 20 thereon. The track 28 may include at least one groove 34 that slidably receives at least a portion of the locator 20 to permit the locator 20 to translate relative to and on the housing 18 between the first end 24 and the second end 26.

The housing 18 may also include a series of graduations 36 disposed on either or both of a top surface 38 or a side surface 40 of the housing 18. The graduations 36 may be positioned at spaced-apart intervals to designate inches and/or millimeters for use in determining a position of the locator 20 between the first end 24 of the housing 18 and the second end 26 of the housing 18. For example, if the locator 20 is moved from the first end 24 of the housing 18 toward the second end 26 of the housing 18, the graduations 36 allow a user to determine the distance the locator 20 has traveled from the first end 24 of the housing 18 toward the second end 26 of the housing 18.

The housing 18 may also include a potentiometer 42 associated with either the top surface 38 or the side surface 40 of the housing 18 in addition to, or in place of the graduations 36. The potentiometer 42 may cooperate with the locator 20 to determine a position of the locator 20 relative to the housing 18. For example, as the locator 20 travels along the housing 18, the resistance detected by the potentiometer 42 will change based on a voltage supplied to the locator 20 and/or housing 18. The change in resistance may be received by a controller 44 for use in determining a position of the locator 20 relative to the housing 18. The controller 44 may be wired to the potentiometer 42 and/or may be in wireless communication with the potentiometer 42 to receive a signal from the potentiometer 42 and determine a position of the locator 20 along the housing 18 between the first end 24 and the second end 26.

The locator 20 is slidably supported by the housing 18 and may include at least one roller 46 rotatably received within the groove 34 of the track 28 to permit translation of the locator 20 relative to the housing 18. The locator 20 may also include a laser pointer 48 that is supported by a body 50 of the locator 20. The laser pointer 48 extends from the locator 20 generally towards the ATD 12 and may selectively project a laser beam from the locator 20 onto the ATD 12 to position the locator 20 relative to the ATD 12. Positioning the locator 20 relative to the ATD 12 also positions the housing 18 relative to the ATD 12, as the locator 20 is supported by and therefore moves with the housing 18.

The measurement device 22 may be positioned on the top surface 38, side surface 40, or bottom surface 52 of the housing 18 such that the measurement device 22 is fixed for movement with the housing 18. The measurement device may include a display 54 and may be in communication with the controller 44. The measurement device 22 determines an angular position of the housing 18 relative to a plane Q intersecting a pivot point of the housing 18. For example, the measurement device 22 may determine an angle $\Theta$ of the housing 18 relative to the plane Q, which extends through a pivot point of the first end 24 of the housing 18 proximate to the striker 30. The measured angle $\Theta$ may be shown on the display 54 and/or transmitted to the controller 44 for use by the controller 44 in determining a position of the ATD 12 relative to the fixture 10, and, thus, to the vehicle opening 16.

Figure 3:
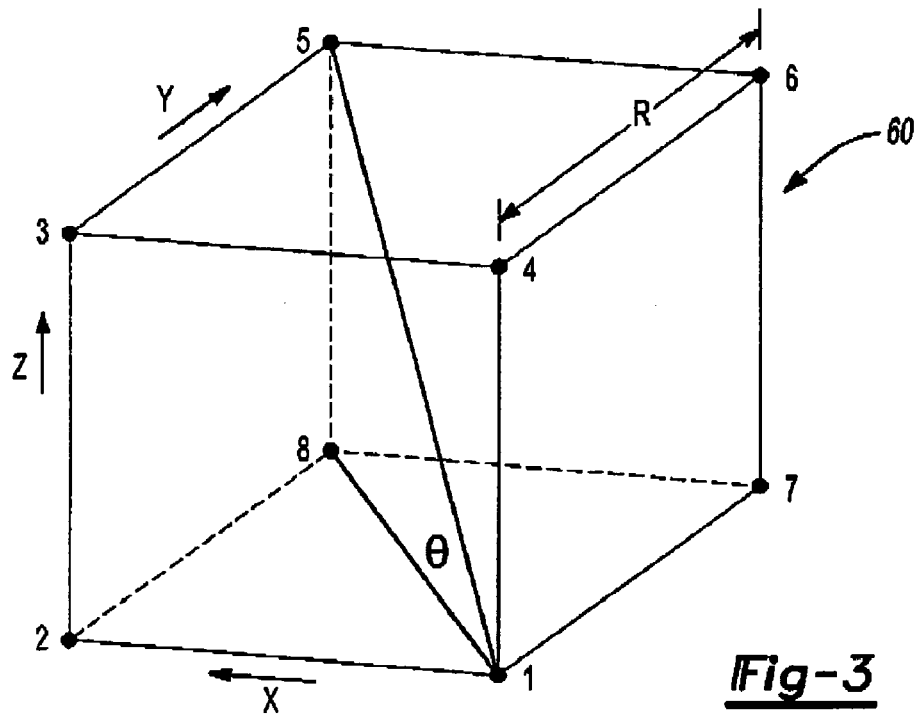
FIG. 3 is a schematic representation of a three-dimensional cube used to determine a position of an ATD relative to a vehicle.
Figure 4:
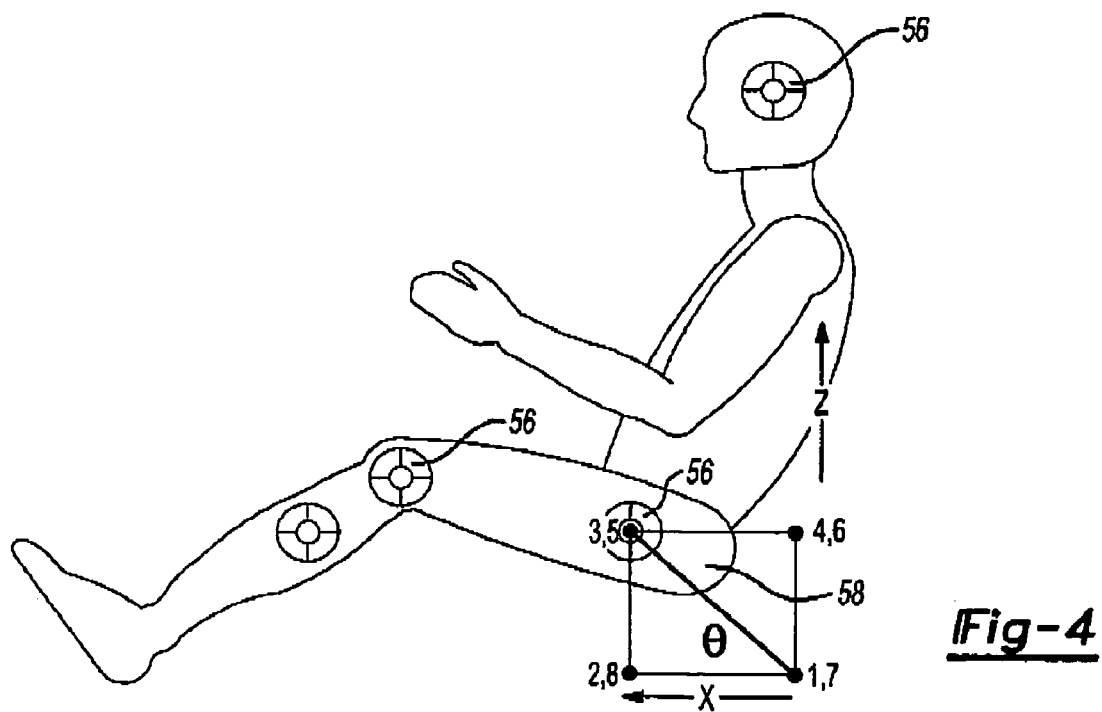
FIG. 4 is a side view of an ATD having a coordinate system positioned thereon.

With particular reference to FIGS. 3 and 4, operation of the fixture 10 will be described in detail. The ATD 12 is initially positioned in the vehicle 14 proximate to the vehicle opening 16. Once the ATD 12 is positioned in the vehicle 14 and proximate to the vehicle opening 16, the fixture 10 may be attached to the vehicle opening 16.

The fixture 10 is attached to the striker 30 to permit the first end 24 of the housing 18 to pivot about the striker 30 and relative to the vehicle 14 and vehicle opening 16. Permitting the first end 24 of the housing 18 to be pivotably attached to the striker 30 allows the housing 18 and, thus, the locator 20 and measurement device 22, to similarly be pivotably attached to the vehicle 14 and vehicle opening 16. Once the fixture 10 is pivotably attached to the vehicle opening 16 at the striker 30, the fixture 10 may be used to determine a position of the ATD 12 relative to the vehicle 14 and vehicle opening 16.

The fixture 10 may be used to determine a position of and align any portion of the ATD 12 relative to the vehicle opening 16. Generally speaking, a target 56 (FIG. 4) may be positioned at any location on the ATD 12 for use in positioning the ATD 12 relative to the vehicle opening 16. For example, a target 56 may be positioned proximate to a hip 58 of the ATD 12 to properly align the hip 58 relative to the vehicle opening 16. Further operation of the fixture 10 will be described with relation to positioning the hip 58 of the ATD 12 relative to the vehicle opening 16. While targets 56 may be located at various other locations of the ATD 12, operation of the fixture 10 is substantially identical regardless of the specific position of the target 56 on the ATD 12. Therefore, the below description is limited to positioning the hip 58 of the ATD 12 relative to the vehicle opening 16. However, it should be understood that positioning other areas of the ATD 12 may be accomplished using the process outlined below.

Once the ATD 12 is loaded into the vehicle 14 and the housing 18 of the fixture 10 is rotatably attached to the vehicle opening 16, the housing 18 may be rotated to a position to allow the locator 20 to identify a location of the target 56 relative to the housing 18. Initially, a force may be applied to the housing 18 to rotate the housing 18 relative to the vehicle opening 16 to permit the locator 20 to project a laser from the laser pointer 48 onto the target 56 of the ATD 12. Once the housing 18 is rotated into a desired position, the locator 20 may be translated relative to the housing 18 until the laser pointer 48 opposes the target 56. The laser pointer 48 may project a laser beam onto the target 56 to ensure that the housing 18 is rotated into a proper position relative to the ATD 12. If the laser beam projected by the laser pointer 48 is not projected onto a center of the target 56, the housing 18 may be further rotated and/or the locator 20 may be further translated between the first end 24 of the housing 18 and the second end 26 of the housing 18 until the laser pointer 48 projects a laser beam onto the center of the target 56.

When the laser pointer 48 projects a laser at the center of the target 56, the housing 18 may be locked in the adjusted angular position by rotating the actuation handle 32 to position the locking mechanism in the locked state. At this point, the housing 18 is restricted from rotating relative to the vehicle opening 16 until the actuation handle 32 is rotated and the locking mechanism is moved into the unlocked state. Once the housing 18 is locked relative to the vehicle opening 16, the position of the locator 20 between the first end 24 of the housing 18 and the second end 26 of the housing 18 may be determined by reading the graduations 36. Alternatively or additionally, the position of the locator 20 relative to the housing 18 may be determined based on a signal output from the controller 44, as received from a potentiometer 42. In addition to the position of the locator 20 relative to the housing 18, the measurement device 22 may display the angular position Θ of the housing 18 relative to plane Q. The angular position Θ may be displayed on the display 54 located on the measurement device 22 and/or may be received by the controller 44 from the measurement device 22.

The position of the locator 20 between the first end 24 of the housing 18 and the second end 26 of the housing 18 and the angular position Θ of the housing 18 relative to plane Q may be used to determine the position of the ATD 12 relative to the vehicle opening 16 along a first axis X and a second axis Z.

With reference to FIG. 3, a schematic representation of a position of the ATD 12 relative to the vehicle opening 16 is provided and is illustrated using a cube 60. The target 56 located at the hip 58 of the ATD 12 is located within the plane identified by coordinates 5, 6, 7, and 8 and generally at coordinate 5. The housing 18, including the locator 20 and measurement device 22, is located within the plane identified by coordinates 1, 2, 3, and 4 and the plane Q is identified by coordinates 1, 2, 7, and 8.

As can be seen in FIG. 3, the plane in which the target 56 resides is spaced apart from the plane in which the housing 18, locator 20, and measurement device 22 resides along a Y axis a distance R. While the target 56 located at the hip 58 of the ATD 12 is spaced apart from the plane in which the housing 18 rotates a distance R, the fixture 10 may approximate the position of the target 56 by projecting the position of the target 56. For example, coordinate 3 projects the position of coordinate 5 when the plane identified by coordinates 1, 2, 3, and 4 is viewed normal to the plane identified by coordinates 1, 2, 3, and 4, as shown in FIG. 4. Therefore, identifying the position of FIG. 3 within the plane identified by coordinates 1, 2, 3, and 4 identifies the position of coordinate 5 and, therefore, approximates the position of the target 56 relative to the vehicle opening 16 along the X axis and the Z axis (FIG. 3).

Once the position of the locator 20 relative to the first end 24 and second end 26 of the housing 18 is known and the angular position Θ of the housing 18 relative to the plane identified by coordinates 1, 2, 7, and 8 is known, trigonometry may be used to identify the position of the target 56 relative to the vehicle opening 16. For example, the position of the target 56 along the X axis may be determined by multiplying the distance of the locator 20 from the first end 24 of the housing 18 by the cosine of Θ. Similarly, the position of the target 56 along the Z axis may be determined by multiplying the distance of the locator 20 from the first end 24 of the housing 18 by the sign of Θ.

Identifying the position of the target 56 along the X axis and the Z axis identifies the position of the target 56 in the X and Z directions within the plane identified by coordinates 1, 2, 3, and 4. Essentially, the above calculation identifies the position of the target 56 along the X axis and the Z axis at coordinate 3. As noted above, coordinate 3 is spaced apart from coordinate 5 (the actual position of the target 56 relative to the vehicle opening 16) by a distance R. However, taking a view normal to the plane, identified by coordinates 1, 2, 3, and 4, the position of coordinate 5 may be projected onto the position of coordinate 3 such that the position of coordinate 5 may be identified along the X axis and the Z axis without concern for the separation of coordinates 3 and 5 along the Y axis (i.e., the distance R).

The above calculations may be computed once the position of the locator 20 between the first end 24 and the second end 26 of the housing 18 and the angular position of the angular position Θ of the housing 18 are known. The calculation may be manually performed and/or may be performed by the controller 44. In either situation, the output of the determination may be compared to a desired position of the ATD 12 relative to the vehicle opening 16. The comparison may output an error based on the desired position of the ATD 12 relative to the vehicle opening 16 to permit adjustment of the position of the ATD 12 relative to the vehicle opening 16.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fixture for positioning an automotive test dummy relative to a vehicle, the fixture comprising:
   a housing attached to the vehicle and including a first end and a second end;
   a locator mounted on said housing and movable along said housing between said first end and said second end to identify a position of the automotive test dummy relative to the housing;
   a target disposed on the automotive test dummy and spaced apart from said housing for alignment with said locator; and
   a first measurement device outputting an angle of said housing to identify an angular position of said target relative to a plane extending through said first end of said housing.

2. The fixture of claim 1, wherein said housing is pivotally attached to the vehicle at said first end.

3. The fixture of claim 2, wherein said first end is attached to a door opening of the vehicle.

4. The fixture of claim 2, wherein said first end is attached to a striker mounted in a door frame of the vehicle.

5. The fixture of claim 1, further comprising a laser pointer mounted on said locator.

6. The fixture of claim 5, wherein said laser pointer is movable with said locator along said housing between said first end and said second end, said laser pointer generating a laser to position said locater and said housing relative to said target.

7. The fixture of claim 1, further comprising a second measurement device mounted to said housing to identify a position of said locator along said housing between said first end and said second end.

8. The fixture of claim 7, wherein said second measurement device includes a series of graduations to identify a position of said locator relative to said housing between said first end and said second end.

9. The fixture of claim 7, wherein said second measurement device includes a potentiometer interacting with said locator to generate a signal indicative of a position of said locator between said first end and said second end of said housing.

10. The fixture of claim 7, further comprising a controller in communication with said first measurement device and said second measurement device, said controller determining a position of said target relative to the vehicle based on a signal received from said first measurement device and a signal received from said second measurement device and outputting a signal indicative of said position of said target relative to the vehicle.

11. A method of positioning an automotive test dummy relative to a vehicle, the method comprising:
   positioning the automotive test dummy in the vehicle;
   attaching a first end of a housing to a vehicle opening;
   rotating said housing relative to the vehicle to position said housing relative to the automotive test dummy;
   translating a locator slidably attached to said housing between a first end of said housing and a second end of said housing to position said locator relative to said target disposed on the automotive test dummy;

identifying a position of said locator along said housing between said first end and said second end;

identifying an angle of said housing relative to a plane intersecting a pivot point of said housing; and determining a position of said target relative to the vehicle opening based on said position of said locator along said housing between said first end and said second end and said angle of said housing relative to said plane.

12. The method of claim 11, wherein said positioning said locator relative to said target includes generating a laser and positioning said laser relative to said target.

13. The method of claim 11, wherein said determining said position of the automotive test dummy relative to the vehicle opening includes multiplying a distance of said locator from said first end of said housing by the sine of said identified angle to determine a position of said target along a first axis.

14. The method of claim 11, wherein said determining said position of said target relative to the vehicle opening includes multiplying a distance of said locator from said first end of said housing by the cosine of said identified angle to determine a position of said target along a second axis.

15. The method of claim 11, further comprising transmitting said identified position of said locator along said housing and said identified angular position of said housing to a controller.

16. The method of claim 15, wherein said determining said position of said target relative to the vehicle opening is performed by said controller.

17. The method of claim 11, wherein said determining said position of said target includes determining at least one of a position of a head, a hip, and a knee of the automotive test dummy.

18. The method of claim 11, further comprising adjusting a position of the automotive test dummy relative to the vehicle opening based on said position of said target relative to said vehicle opening.

19. The method of claim 11, further comprising comparing said determined position of said target relative to the vehicle opening and outputting an error.

20. The method of claim 19, further comprising adjusting a position of the automotive test dummy based on said error.

* * * * *